United States Patent
Jinno

(10) Patent No.: US 8,359,153 B2
(45) Date of Patent: Jan. 22, 2013

(54) INDICATION APPARATUS FOR HYBRID VEHICLE

(75) Inventor: Kunihiko Jinno, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/369,597

(22) Filed: Feb. 9, 2012

(65) Prior Publication Data
US 2012/0136531 A1    May 31, 2012

Related U.S. Application Data

(62) Division of application No. 12/445,409, filed as application No. PCT/JP2007/070514 on Oct. 16, 2007.

(30) Foreign Application Priority Data

Nov. 7, 2006  (JP) ................... 2006-301816

(51) Int. Cl.
*G06F 19/00* (2011.01)

(52) U.S. Cl. .......................... 701/123; 701/22

(58) Field of Classification Search .............. 701/22, 701/29, 36, 123
See application file for complete search history.

(56) References Cited

U.S. PATENT DOCUMENTS

| | | | |
|---|---|---|---|
| 3,604,963 A | 9/1971 | Tawara | |
| 5,309,139 A | 5/1994 | Austin | |
| 5,697,466 A | 12/1997 | Moroto et al. | |
| 5,757,595 A | 5/1998 | Ozawa et al. | |
| 5,808,445 A | 9/1998 | Aylor et al. | |
| 5,929,595 A | 7/1999 | Lyons et al. | |
| 6,158,541 A * | 12/2000 | Tabata et al. | 180/165 |
| 6,380,640 B1 | 4/2002 | Kanamori et al. | |
| 6,457,351 B1 | 10/2002 | Yamamoto | |
| 6,480,106 B1 | 11/2002 | Crombez et al. | |
| 6,774,771 B2 | 8/2004 | Takeda | |
| 7,898,405 B2 | 3/2011 | Burke et al. | |
| 2002/0171541 A1 | 11/2002 | Crombez et al. | |
| 2005/0068007 A1 | 3/2005 | Prema et al. | |
| 2005/0200463 A1 | 9/2005 | Situ et al. | |
| 2005/0263333 A1* | 12/2005 | Fujiki | 180/65.2 |
| 2006/0185917 A1 | 8/2006 | Ozeki et al. | |
| 2007/0029121 A1 | 2/2007 | Saitou et al. | |
| 2008/0042821 A1 | 2/2008 | Kaya | |
| 2008/0099603 A1* | 5/2008 | Yamamoto et al. | 244/110 A |

(Continued)

FOREIGN PATENT DOCUMENTS

| | | |
|---|---|---|
| DE | 195 33 829 C1 | 9/1996 |
| DE | 10 2006 008 064 A1 | 8/2006 |

(Continued)

OTHER PUBLICATIONS

Final Office Action dated Feb. 27, 2012, issued in corresponding U.S. Appl. No. 12/445,409.

(Continued)

*Primary Examiner* — Hussein A. Elchanti
(74) *Attorney, Agent, or Firm* — Sughrue Mion, PLLC

(57) ABSTRACT

An ECU executes a program including: steps of detecting an SOC and a temperature TB of a traction battery; when an EV switch is on, a step of calculating a temperature correction coefficient α from TB; when EV switch not on, a step of calculating a temperature correction coefficient α from TB; steps of calculating an EV traveling allowed power value WOUT based on the SOC and the temperature correction coefficients; and a step of transmitting EV traveling allowed power value WOUT to a meter ECU in order to indicate EV traveling allowed power value WOUT on a power meter.

12 Claims, 9 Drawing Sheets

U.S. PATENT DOCUMENTS

| | | |
|---|---|---|
| 2009/0322503 A1 | 12/2009 | Suzuki et al. |
| 2010/0049389 A1 | 2/2010 | Ando |

FOREIGN PATENT DOCUMENTS

| | | |
|---|---|---|
| EP | 1707430 A1 | 10/2006 |
| JP | 07-315078 A | 12/1995 |
| JP | 08-079907 A | 3/1996 |
| JP | 2005-035413 A | 9/1996 |
| JP | 09-168202 A | 6/1997 |
| JP | 11-220808 A | 8/1999 |
| JP | 2000-234538 A | 8/2000 |
| JP | 2001-112112 A | 4/2001 |
| JP | 2002-247706 A | 8/2002 |
| JP | 2003-023703 A | 1/2003 |
| JP | 2005-255158 A | 9/2005 |
| JP | 2006-220482 A | 8/2006 |
| JP | 2006-233760 A | 9/2006 |
| JP | 2006-290182 A | 10/2006 |
| JP | 2006-321364 A | 11/2006 |
| JP | 2007-125921 A | 5/2007 |
| JP | 2007-186045 A | 7/2007 |
| JP | 2007-237970 A | 9/2007 |
| JP | 2007-314100 A | 12/2007 |
| JP | 2008-074321 A | 4/2008 |
| RU | 2223183 C2 | 2/2004 |
| WO | WO 2006/001809 A1 | 1/2006 |

OTHER PUBLICATIONS

Chinese Office Action dated Jan. 4, 2012, issued in corresponding Chinese Patent Application No. 200780041377.X.

Extended European Search Report for corresponding European Application No. 07830248, dated Feb. 22, 2011.

Final Office Action dated Oct. 28, 2011, issued in U.S. Appl. No. 12/310,332.

Harrier Hybrid New Car Model Guide, Toyota Jidosha Kabushiki Kaisha, Mar. 22, 2005 pp. 11-176-178 and 11-183 (with partial translation).

Hybrid Interfaces CA, retrieved from http://web.archive.org/web/20060207023347/http:/hybridinterfaces.ca/index.html, accessed Oct. 13, 2011.

Norbye et al., ". . . and a Commuter Car with Hybrid Drive," Popular Sciene, Jul. 1969, pp. 86-87.

Russian Office Action for corresponding Russian Patent Application No. 2009121523 mailed Nov. 22, 2010.

Russian Office Action issued in corresponding Russian Application No. 2009121523/11 dated May 3, 2011.

TwEECer, retrieved from http://web.archive.org/web/20030206054058/http://www.tweecer.com/tellmore.htm, accessed Oct. 13, 2011.

USPTO Office Action issued in U.S. Appl. No. 12/310,332 dated May 5, 2011.

Non-Final Office Action dated Mar. 16, 2012, issued in corresponding U.S. Appl. No. 12/310,332.

Knowling, Michael, New Car Test—New Generation Prius, Jan. 31, 2004, Autoweb accessed Mar. 7, 2012, http://www.autoweb.com.au/A_2012/cms/article.html.

* cited by examiner

F I G. 3
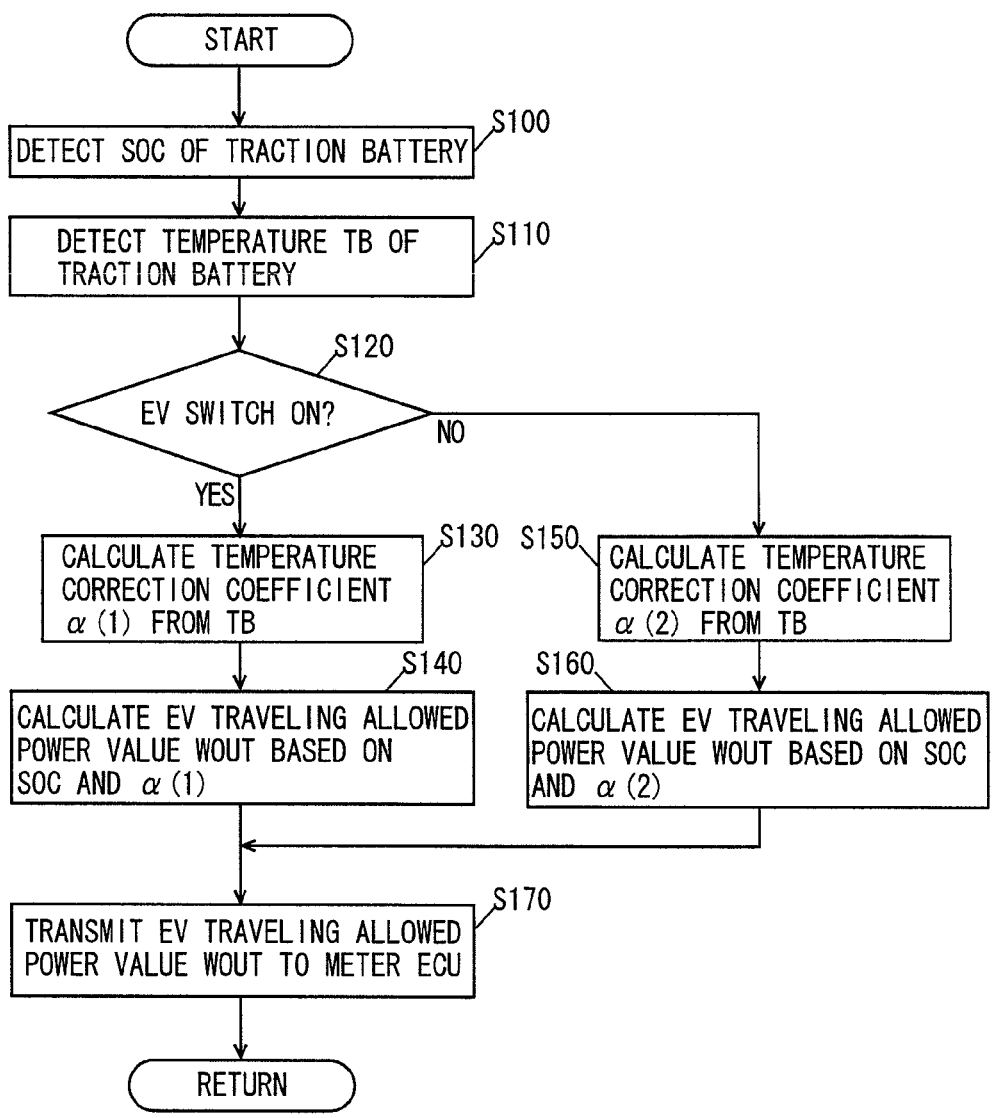

INDICATION APPARATUS FOR HYBRID VEHICLE

INCORPORATION BY REFERENCE

This is a divisional of U.S. application Ser. No. 12/445,409, filed Apr. 13, 2009, which is a National Stage of PCT/2007/070514, filed Oct. 16, 2007, which claims priority from Japanese Patent Application No. 2006-301816 filed Nov. 7, 2006, the disclosures of which are incorporated by reference in their entirety.

TECHNICAL FIELD

The present invention relates to a hybrid vehicle, and in particular, to a technique of informing the driver of the actuation state of motive power sources, the regeneration state and the like.

BACKGROUND ART

Hybrid vehicles incorporating, as motive power sources for traveling of the vehicle, an engine actuating by energy from combustion of fuel and a motor actuating by electric energy, and being provided with an automatic transmission (including a power split device) between the motive power sources and driving wheels, have been put into practical use. In such a hybrid vehicle, traveling based on selective use of the engine and the motor, e.g., in accordance with a driving state, can reduce fuel consumption or emission while maintaining a prescribed traveling performance. Specifically, the vehicle is provided with a plurality of drive modes being different in the actuation state of the engine and the motor, such as the engine traveling mode in which the vehicle travels employing solely the engine as the motive power source, the motor traveling mode in which the vehicle travels employing solely the motor as the motive power source (hereinafter, the motor traveling mode may also be referred to as the EV mode), the engine+motor traveling mode in which the vehicle travels employing both the engine and the motor as the motive power sources. They can automatically be switched in accordance with predetermined mode switching conditions such as a motive power source map employing drive states such as a vehicle speed (or a rotation speed of the motive power sources) and an accelerator pedal operation amount as parameters.

Meanwhile, in such a hybrid vehicle, indication of only the vehicle speed and engine speed as in a conventional engine-driven vehicle employing solely the engine as the motive power source provides only insufficient information for recognizing the actuation state of the motive power sources or the traveling state. For example, indication of the engine speed during the motor traveling mode (which is normally 0) is not helpful. Thus, the driver's need may not always be fully fulfilled.

Harrier Hybrid New Car Model Guide (issued on Mar. 22, 2005 by TOYOTA JIDOSHA KABUSHIKI KAISHA) discloses a combination meter of a hybrid vehicle. The combination meter includes a circular power meter, which is similar to an engine speed meter (tachometer) that indicates the total value of engine output and motor output. The indication range of the power meter is −40~200 kW, wherein the position (range) of a pointer of the meter lower than 0 means energy recovery.

However, the power meter disclosed in the guide merely shows the output and regeneration state as a hybrid system. Therefore, the driver cannot recognize, for example, how far the accelerator pedal can be pressed down when the vehicle is traveling in the EV mode with the engine stopped, before the engine thereby starts actuation (because it is not possible to satisfy the acceleration request by traveling solely by the motor) (the start of actuation of the engine after activation of the system may also be referred to as "startup"), and how far the brake pedal can be pressed down when the vehicle is traveling (in any mode), before the regenerative braking where energy can be recovered is thereby exited (because it is not possible to satisfy the deceleration request solely by the regenerative braking, or because it is not possible to store the generated power in the battery) the mechanical type brake (hereinafter also referred to as a mechanical brake) starts actuation. As a result, there may be a case where the engine actuates and the fuel efficiency is deteriorated, or a case where the mechanical brake actuates and the energy is not recovered, whereby the fuel efficiency is deteriorated.

DISCLOSURE OF THE INVENTION

The present invention has been made to solve the above-described problems, and an object thereof is to provide an indication apparatus for a hybrid vehicle that realizes easy avoidance of actuation of the engine or the mechanical brake due to the driver's operation which consequently would deteriorate fuel efficiency.

An indication apparatus for a hybrid vehicle according to the present invention is an indication apparatus for a hybrid vehicle employing, as traveling sources for the vehicle, an engine and a rotating electric machine actuating by electric power supplied from a power storage mechanism. The indication apparatus includes: a calculation portion to calculate an index with which the vehicle is allowed to travel by the rotating electric machine without actuating the engine; and an indication portion to indicate the index so as to inform a driver of the index.

According to the present invention, the hybrid vehicle is allowed to travel by at least one of the engine and the rotating electric machine (a motor-generator or a motor) actuating by electric power supplied from the power storage mechanism. Since fuel is consumed when the engine is actuated, it is preferable not to allow the engine to actuate from the standpoint of improvement in fuel efficiency. For example, if the driver presses down the accelerator pedal during traveling of the hybrid vehicle by the motor with the engine stopped, the request power becomes great (for example, 10 kW) and the acceleration request cannot be satisfied by traveling solely by the motor. Thus, the engine actuates. In order to inform the driver of the situation, an index with which the vehicle is allowed to travel by the motor without actuating the engine is calculated and the driver is informed of the same. By looking at the informed index, the driver can easily recognize the extent of the index (power) with which the vehicle is allowed to travel solely by the motor. Thus, the driver who does not wish to actuate the engine looks at the index and operates the accelerator pedal so as not to actuate the engine (i.e., not to excessively increase the request power). This can avoid actuation of the engine. As a result, it becomes possible to provide the indication apparatus for the hybrid vehicle that realizes easy avoidance of actuation of the engine due to the driver's operation which consequently would deteriorate fuel efficiency.

Preferably, the calculation portion calculates the index based on whether or not the driver requests a drive mode in which the vehicle is allowed to travel without actuating the engine.

According to the present invention, in recent hybrid vehicles, the driver can request a drive mode in which the vehicle is allowed to travel without actuating the engine, in consideration of noises disturbing the neighborhood when driving through a residential area early in the morning or late at night. When such a mode is requested, the index with which the vehicle is allowed to travel by the rotating electric machine without actuating the engine can be calculated in a greater value, so as to further satisfy the request of the driver. Thus, it becomes possible to provide the indication apparatus for the hybrid vehicle that realizes easy avoidance of deterioration of fuel efficiency while taking into account of the driver's request.

An indication apparatus for a hybrid vehicle according to another aspect of the present invention is an indication apparatus for a hybrid vehicle employing, as traveling sources for the vehicle, an engine and a rotating electric machine actuating by electric power supplied from a power storage mechanism, the rotating electric machine being actuated by the engine or driving wheels thereby generating electric power which is in turn stored in the power storage mechanism. The indication apparatus includes: a calculation portion to calculate an index with which the vehicle is allowed to decelerate without actuating a mechanical braking mechanism provided to the vehicle; and an indication portion to indicate the index so as to inform a driver of the index.

According to the present invention, the hybrid vehicle is allowed to travel by at least one of the engine and the rotating electric machine (a motor-generator actuating as a motor) actuating by electric power supplied from the power storage mechanism, and the rotating electric machine (the motor-generator actuating as a generator) is actuated by the engine or the driving wheels thereby generating electric power which is in turn stored in the power storage mechanism. Since fuel is consumed when the generator is actuated by the engine to generate electric power, it is preferable to actuate the generator not by the engine but by the driving wheels during braking to thereby generate electric power, from the standpoint of improvement in fuel efficiency. For example, if the power that can be accepted by the power storage mechanism is small or if the deceleration request is great when the driver presses down the accelerator pedal during traveling of the hybrid vehicle, the mechanical braking mechanism (a mechanical brake) actuates. The mechanical brake merely converts the kinetic energy of the vehicle into thermal energy, and therefore the energy will be lost. In order to inform the driver of the situation, an index with which the vehicle is allowed to decelerate without actuating the mechanical brake provided to the vehicle is calculated and the driver is informed of the same. By looking at the informed index, the driver can easily recognize the extent of the index (power) with which regenerative braking is allowed. Thus, the driver who does not wish to actuate the engine looks at the index and operates the brake pedal so as not to actuate the mechanical brake. This can avoid actuation of the mechanical brake. As a result, it becomes possible to provide the indication apparatus for the hybrid vehicle that realizes easy avoidance of actuation of the mechanical brake due to the driver's operation which consequently would deteriorate fuel efficiency.

Preferably, the power storage mechanism is a secondary battery, and the calculation portion calculates the index based on a state of the secondary battery.

According to the present invention, the electric power input/output performance of the secondary battery changes depending on the state (SOC (State Of Charge), temperature or the like) of the secondary battery. When the output performance is poor, it is not possible to obtain greater energy for traveling solely by the motor. When the input performance is poor, even when greater energy is recovered by regenerative braking, the energy cannot be accepted by a great amount. Therefore, calculating the index based on the state of the secondary battery as above, it becomes possible to inform the driver of the index that may actually input to or output from the secondary battery.

Preferably, the calculation portion calculates the index based on a temperature of the secondary battery.

According to the present invention, the electric power input/output performance of the secondary battery changes depending on the temperature of the secondary battery. When the temperature is low, as compared with the case where the temperature is high, the output performance is poor and it is not possible to obtain greater energy for traveling solely by the motor, and the input performance is poor and energy by regenerative braking cannot be accepted by a great amount. Therefore, calculating the index based on the temperature of the secondary battery as above, it becomes possible to inform the driver of the index that may actually input to or output from the secondary battery.

Preferably, the indication portion indicates the index in an instrument panel in front of a driver's seat.

According to the present invention, since the index is indicated in the instrument panel in front of the driver's seat, the driver can easily recognize the index.

BRIEF DESCRIPTION OF THE DRAWINGS

FIGS. 3-5 are flowcharts each showing a control structure of a program executed by the hybrid ECU in FIG. 1.

BEST MODES FOR CARRYING OUT THE INVENTION

Figure 1:
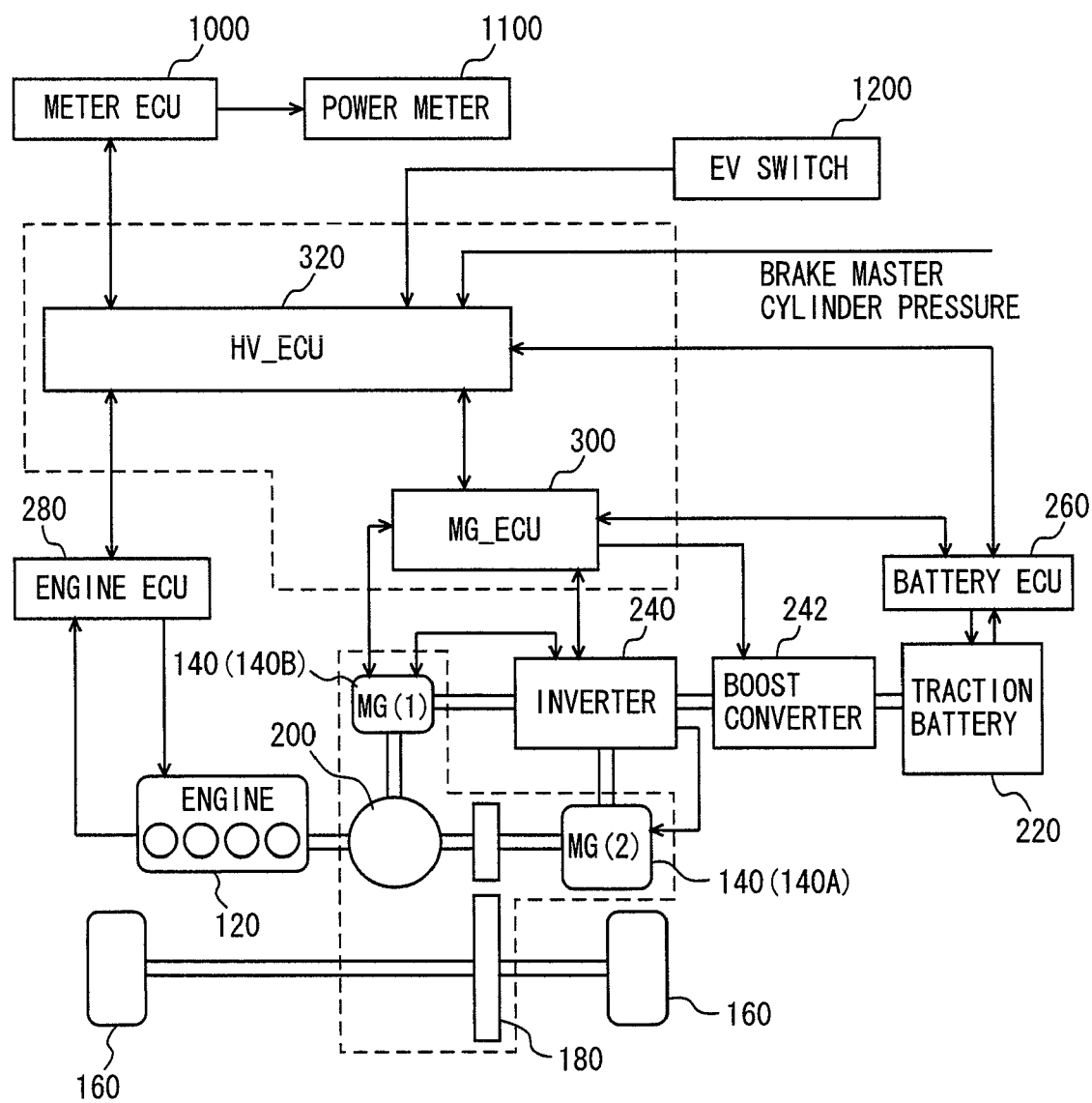
FIG. 1 is a control block diagram of the entire hybrid vehicle including an indication apparatus according to the present embodiment.

Hereinafter, embodiments of the present invention will be described in detail with reference to the drawings. In the following description, identical parts will be denoted by identical reference characters. Their labels and functions are also identical. Therefore, detailed descriptions thereof will not be repeated.

Referring to FIG. 1, a control block diagram of a hybrid vehicle including an indication apparatus according to an embodiment of the present invention will now be described. It should be noted that the present invention is not limited to the hybrid vehicle shown in FIG. 1, as long as an internal combustion engine (hereinafter described as an engine) such as a gasoline engine, for example, as a motive power source serves as a driving source (traveling source) for allowing the vehicle to travel and also serves as a driving source of a generator. Additionally, such a vehicle is only required to be a vehicle wherein the engine and the motor-generator are the driving sources, and to be capable of traveling by the motive power by the motor-generator (irrespective of whether or not the engine is stopped). The vehicle may be a hybrid vehicle of another form, i.e., equipped with a battery for traveling, having the EV mode and being capable of exerting regenerative braking control (it may be what is called parallel type or parallelseries type). The battery is a lithium-ion battery, a nickel-metal hydride battery or the like. The type thereof is not particularly limited. A capacitor can replace the battery. It is to be noted that the temperature characteristic described later differs depending on the type of the battery. When a capacitor is employed, not SOC described later but other index (charged energy or the like) is used.

The hybrid vehicle includes an engine 120 and a motor-generator (MG) 140. In the following, for ease of explanation, while motor-generator 140 will be expressed as motor-generator 140A (or MG(2) 140A) and motor-generator 140B (or MG(1) 140B), motor-generator 140A can function as a generator and motor-generator 140B can function as a motor, depending on the traveling state of the hybrid vehicle. When the motor-generator functions as a generator, regenerative braking is performed. When the motor-generator functions as a generator, the kinetic energy of the vehicle is converted into electric energy, and the vehicle is decelerated.

The hybrid vehicle is also provided with: a reduction gear mechanism 180 that transmits motive power generated by engine 120 and motor-generator 140 to driving wheels 160, and transmits the driving of driving wheels 160 to engine 120 and motor-generator 140; a power split device (e.g., a planetary gear mechanism that will be described later) 200 that distributes the motive power generated by engine 120 between two paths, i.e., driving wheels 160 and motor-generator 140B (MG(1) 140B); a traction battery 220 that stores electric power for driving motor-generator 140; an inverter 240 that controls the current while converting direct current of traction battery 220 and alternating current of motor-generator 140A (MG(2) 140A) and motor-generator 140B (MG(1) 140B); a battery control unit (hereinafter referred to as a battery ECU (Electronic Control Unit)) 260 that manages and controls the charge and discharge state (e.g., SOC) of traction battery 220; an engine ECU 280 that controls the operation state of engine 120; an MG_ECU 300 that controls motor-generator 140, battery ECU 260, inverter 240 and the like according to the state of the hybrid vehicle; an HV_ECU 320 that controls the overall hybrid system by mutually managing and controlling battery ECU 260, engine ECU 280, MG_ECU 300 and the like so that the hybrid vehicle can run most efficiently; and the like.

To HV_ECU 320, an EV mode request signal is input from an EV switch 1200, which is a switch for allowing the driver to select the EV mode in which the vehicle is allowed to travel without actuating engine 120.

To a meter ECU 1000, HV_ECU 320 outputs an EV traveling allowed power value WOUT for indicating on power meter 1100 the power with which the vehicle is allowed to travel in the EV mode. To meter ECU 1000, HV_ECU 320 also outputs a regeneration acceptable power value WIN for indicating on power meter 1100 the power acceptable by (charged on) traction battery 220 in regenerative braking. To meter ECU 1000, HV_ECU 320 also outputs a lamp-on instruction signal, which is for indicating on power meter 1100 a lamp that shows that the regeneration power has exceeded the regeneration acceptable power value WIN whereby the mechanical brake has actuated, based on a brake master cylinder pressure. Therefore, a signal indicative of the brake master cylinder pressure is input to HV_ECU 300 via the brake ECU.

Such processing is performed by a program executed by HV_ECU 320. It is to be noted that, instead of HV_ECU 320 performing such processing, meter ECU 1000 may perform the processing to be indicated on indicating portion 1100. That is, which ECU performs such processing is not limited. In the following, description will be given assuming that EV traveling allowed power value WOUT and regeneration acceptable power value WIN calculated by HV_ECU 320 are indicated on power meter 1100 via meter ECU 1000.

In the present embodiment, a boost converter 242 is provided between traction battery 220 and inverter 240. Since the rated voltage of traction battery 220 is lower than the rated voltage of motor-generator 140A (MG(2) 140A) and motor-generator 140B (MG(1) 140B), when electric power is supplied from traction battery 220 to motor-generator 140A (MG(2) 140A) and motor-generator 140B (MG(1) 140B), boost converter 242 boosts the electric power.

In FIG. 1, each ECU is structured separately, but two or more ECUs may also be formed as one integrated ECU (an example of such a case may be MG_ECU 300 and the HV_ECU 320 integrated as one ECU, as shown by the dashed line in FIG. 1).

A planetary gear mechanism is used for power split device 200 to divide the motive power from engine 120 between driving wheels 160 and motor-generator 140B (MG(1) 140B). Power split device 200 can also function as a continuously variable transmission by controlling the speed of motor-generator 140B (MG(1) 140B). Rotation power of engine 120 is input to a carrier (C). From there it is transmitted to motor-generator 140B (MG(1) 140B) by a sun gear (S), and transmitted to motor-generator 140A (MG(2) 140A) and an output shaft (on the side with the driving wheels 160) by a ring gear (R). When the rotating engine 120 is to be stopped, it is still rotating so kinetic energy of that rotation is converted into electric energy by motor-generator 140B (MG(1) 140B), thereby reducing the speed of engine 120.

In the hybrid vehicle equipped with the hybrid system shown in FIG. 1, when a predetermined condition for the state of the vehicle is satisfied, HV_ECU 320 controls engine 120 via motor-generator 140A (MG(2) 140A) and engine ECU 280 so that the hybrid vehicle travels solely by motor-generator 140A (MG(2) 140A) of motor-generator 140. The predetermined condition is, for example, a condition that SOC of traction battery 220 is not smaller than a predetermined value. Thus, when the vehicle starts or when the vehicle is traveling at low speeds and the efficiency of engine 120 is poor, the hybrid vehicle can travel solely by motor-generator 140A (MG(2) 140A). As a result, SOC of traction battery 220 can be reduced (thereafter when the vehicle parks, traction battery 220 can be charged).

During normal traveling, motive power from engine 120 is distributed between two paths by power split device 200, for example, one being for directly driving driving wheels 160, and the other being for driving motor-generator 140B (MG(1) 140B) to generate electric power. The electric power generated at this time is used to drive motor-generator 140A (MG(2) 140A) to thereby assist driving of driving wheels 160. When running at high speeds, traction battery 220 supplies electric power to motor-generator 140A (MG(2) 140A) to further increase the output of motor-generator 140A (MG(2) 140A), thereby providing additional driving force to driving wheels 160. During deceleration, on the other hand, motor-generator 140A (MG(2) 140A) that operates following driving wheels 160 functions as a generator and regenerates electric power. The recovered electric power is stored in traction battery 220. When the SOC of traction battery 220 drops and charging is particularly necessary, the output of engine 120 is increased to increase the amount of electric power generated by motor-generator 140B (MG(1) 140B), thereby increasing the SOC of the running battery 220.

Normally, the target SOC of traction battery 220 is set to about 60% so that energy can be recovered irrespective of the timing of regeneration. The upper and lower limits of SOC are respectively set to 80% and 30%, in order to suppress battery deterioration of traction battery 220. HV_ECU 320 controls the generation, regeneration and motor output by motor-generator 140 via MG_ECU 300 so that SOC does not exceed the upper or lower limit. It is to be noted that the values shown herein are merely examples and not so specifically limited.

Figure 2:
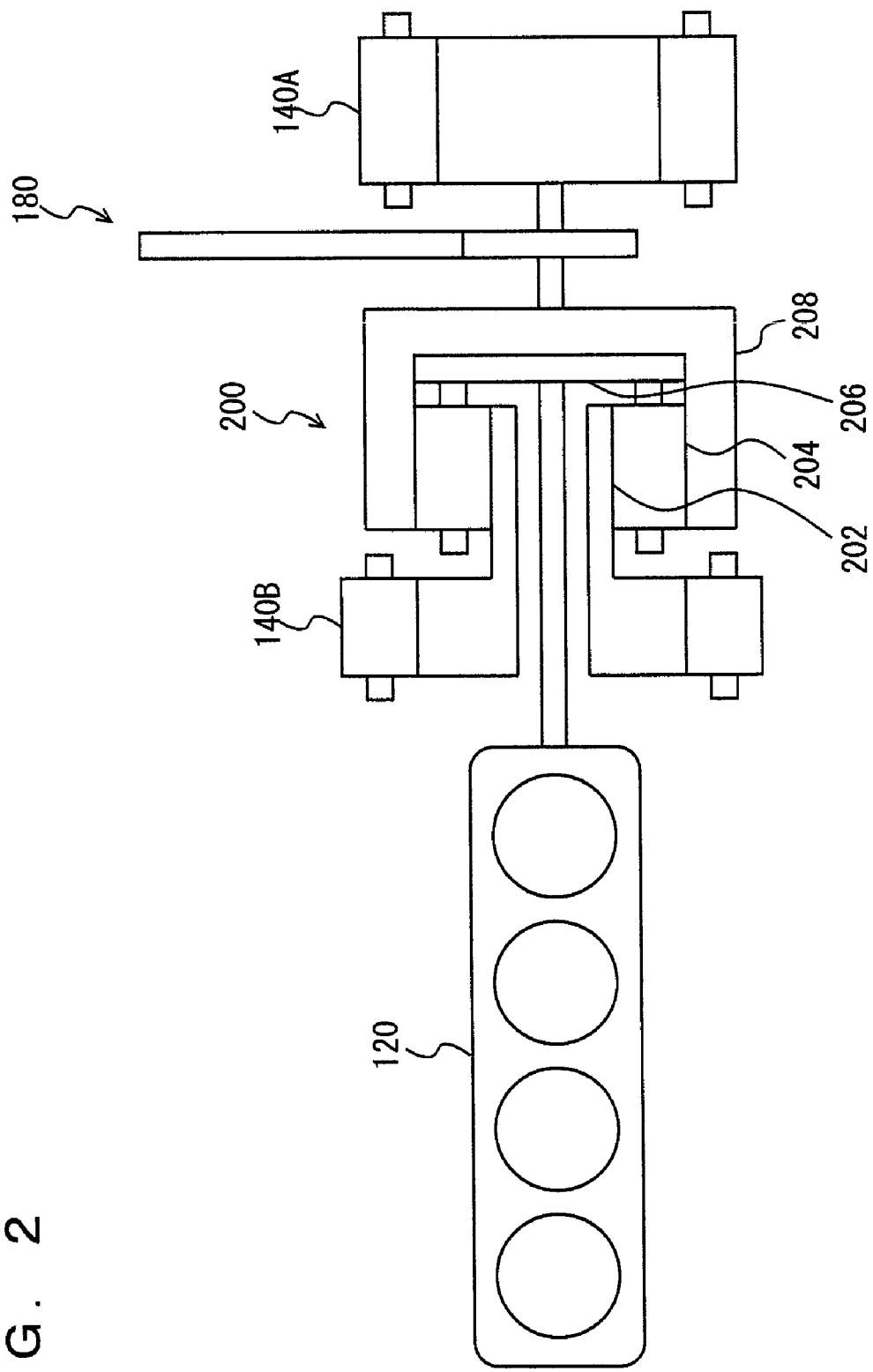
FIG. 2 shows a power split device.

Referring to FIG. 2, power split device 200 will further be described. Power split device 200 is formed by a planetary gear including a sun gear (S) 202 (hereinafter simply referred to as sun gear 202), a carrier (C) 206 (hereinafter simply referred to as carrier 206), and a ring gear (R) 208 (hereinafter simply referred to as ring gear 208).

Pinion gear 204 engages with sun gear 202 and ring gear 208. Carrier 206 supports pinion gear 204 so that it can rotate on its axis. Sun gear 202 is coupled to the rotation shaft of MG(1) 140B. Carrier 206 is coupled to the crankshaft of engine 120. Ring gear 208 is coupled to the rotation shaft of MG(2) 140A and reduction gear mechanism 180.

As engine 120, MG(1) 140B and MG(2) 140A are coupled via power split device 200 formed by the planetary gear, the speeds of engine 120, MG(1) 140B and MG(2) 140A are in the relationship being connected by a straight line in a nomographic chart, for example.

Figure 4:
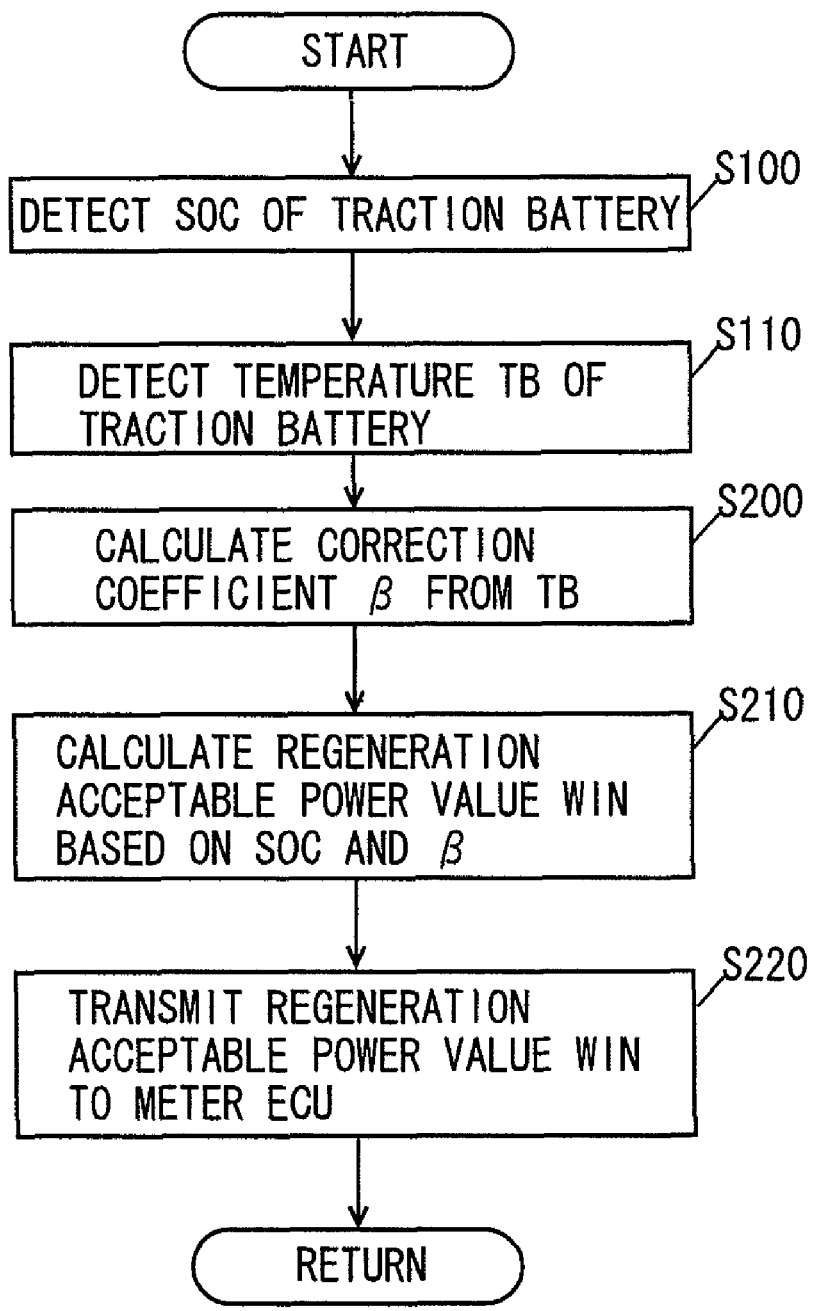
Figure 5:
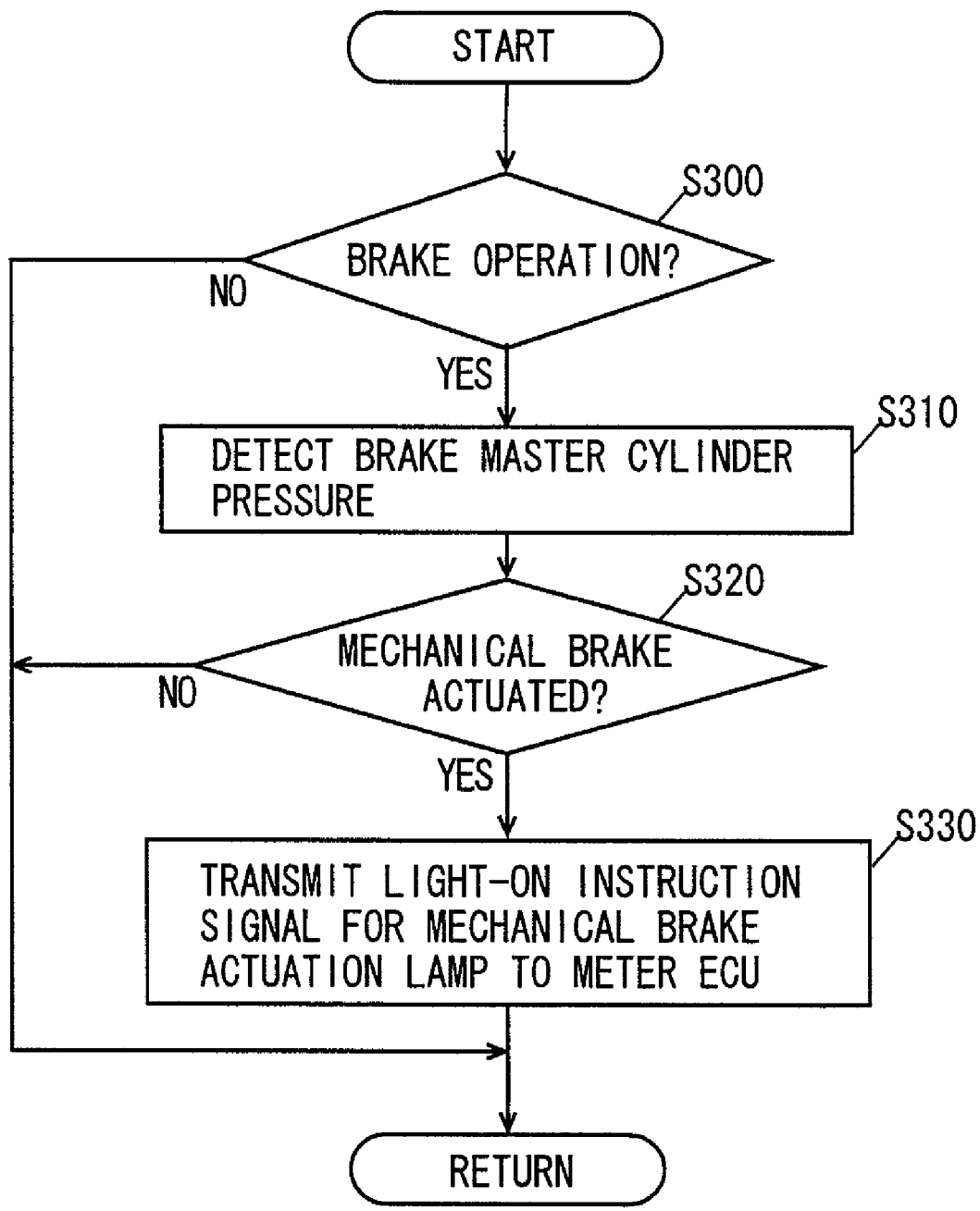

Referring to FIG. 3, a control structure of a program executed by HV_ECU 320 controlling the indication apparatus according to the present embodiment will be described. It is to be noted that the program (sub-routine) shown by the flowchart is repeatedly executed by a predetermined cycle time (for example, 80 msec). The program is for calculating EV traveling allowed power value WOUT. The temperature correction coefficients in the description of the flowchart will be described together after the flowcharts of FIGS. 3-5 are described.

In step (hereinafter step is expressed as S) 100, HV_ECU 320 detects an SOC of traction battery 220 based on a signal input from battery ECU 260. In S110, HV_ECU 320 detects a temperature TB of traction battery 220 based on a signal input from battery ECU 260.

In S120, HV_ECU 320 determines as to whether or not EV switch 1200 is on. When EV switch 1200 is on (YES in S120), the processing moves to S130. Otherwise (NO in S120), the processing moves to S150.

In S130, HV_ECU 320 calculates a temperature correction coefficient $\alpha(1)$ (for EV switch 1200 being on) based on temperature TB of traction battery 220. In S140, HV_ECU 320 calculates EV traveling allowed power value WOUT based on the SOC of traction battery 220 and temperature correction coefficient $\alpha(1)$. Here, a conversion processing is performed in order to unify the unit of the SOC and that of EV traveling allowed power value WOUT. Thereafter, the processing moves to S170.

In S150, HV_ECU 320 calculates a temperature correction coefficient $\alpha(2)$ (for EV switch 1200 being off) based on temperature TB of traction battery 220. In S160, HV_ECU 320 calculates EV traveling allowed power value WOUT based on the SOC of traction battery 220 and temperature correction coefficient $\alpha(2)$. A conversion processing is performed similarly as described above. Thereafter, the processing moves to S170.

In S170, HV_ECU 320 transmits EV traveling allowed power value WOUT to meter ECU 1000.

Next, referring to FIG. 4, a control structure of a program for calculating regeneration acceptable power value WIN executed by HV_ECU 320 controlling the indication apparatus according to the present embodiment will be described. It is to be noted that the program (sub-routine) shown by the flowchart is also repeatedly executed by a predetermined cycle time (for example, 80 msec). In the flowchart of FIG. 4, the same step numbers are allotted to the same processes as those shown in FIG. 3. Their processing are the same. Accordingly, detailed description thereof will not be repeated herein.

In S200, HV_ECU 320 calculates temperature correction coefficient $\beta$ based on temperature TB of traction battery 220. In S210, HV_ECU 320 calculates regeneration acceptable power value WIN based on SOC of traction battery 220 and temperature correction coefficient $\beta$. Here, conversion processing is performed in order to unify the unit of the SOC and regeneration acceptable power value WIN.

In S220, HV_ECU 320 transmits regeneration acceptable power value WIN to meter ECU 1000.

Next, referring to FIG. 5, a control structure of a program for turning on a mechanical brake actuation lamp executed by HV_ECU 320 controlling the indication apparatus according to the present embodiment will be described. It is to be noted that the program (sub-routine) shown by the flowchart is also repeatedly executed by a predetermined cycle time (for example, 80 msec).

In S300, HV_ECU 320 determines as to whether or not there is a brake operation. Here, HV_ECU 320 determines based on a signal input from a not-shown brake switch. When the driver presses down the foot brake (YES in S300), the processing moves to S310. Otherwise (NO in S300), the processing ends.

In S310, HV_ECU 320 detects a brake master cylinder pressure based on a signal input via the brake ECU.

In S320, HV_ECU 320 determines as to whether or not the mechanical brake has actuated. Here, HV_ECU 320 determines that the mechanical brake has actuated if the brake master cylinder pressure is not smaller than a predetermined threshold value. When the mechanical brake has actuated (YES in S320), the processing moves to S330. Otherwise (NO in S320), the processing ends.

In S330, HV_ECU 320 transmits a light-on instruction signal for the mechanical brake actuation lamp to meter ECU 1000.

Figure 6:
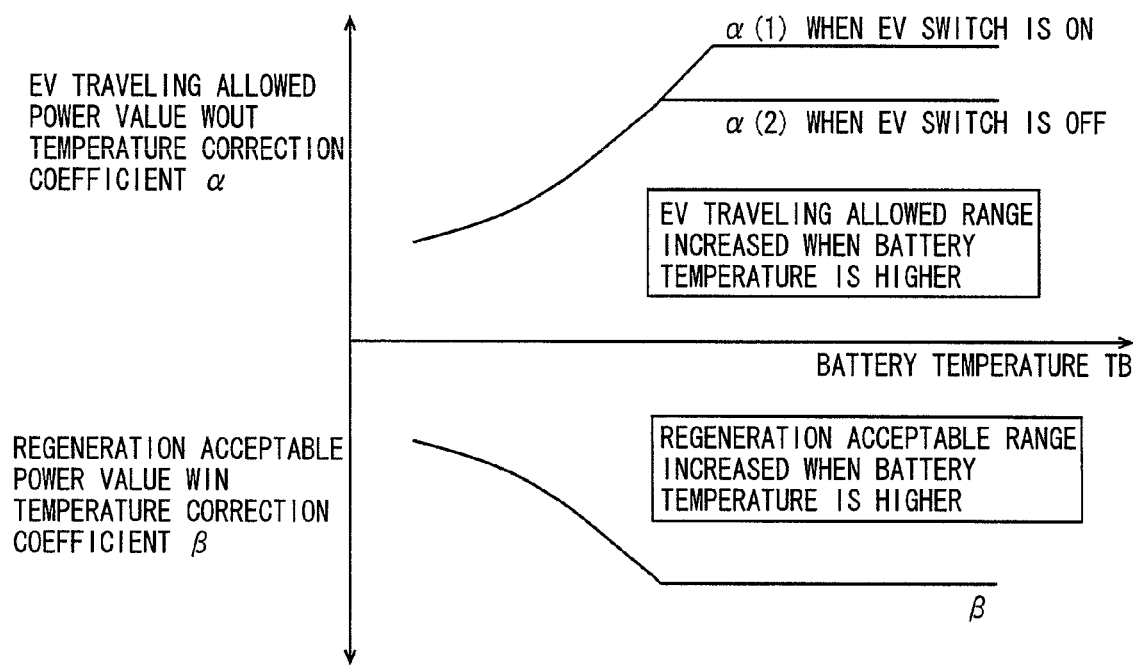
FIG. 6 shows a temperature correction coefficient calculation map stored in the hybrid ECU in FIG. 1.

Referring to FIG. 6, correction coefficient $\alpha(1)$, correction coefficient $\alpha(2)$, and correction coefficient $\beta$ which are temperature correction coefficients used in S130, S150 in the flowchart of FIG. 3 and S200 in FIGS. 4 and 5 will be described.

In the map of FIG. 6, the horizontal axis indicates temperature TB of traction battery 220, whereas the upper part of the vertical axis indicates correction coefficient $\alpha$ for providing temperature correction to EV traveling allowed power value WOUT and the lower part of the vertical axis indicates correction coefficient $\beta$ for providing temperature correction to regeneration acceptable power value WIN.

In the vertical axis, the absolute value of a coefficient is greater as farther away from the center, in both the upper and lower directions. That is, when temperature TB of traction battery 220 is greater, temperature correction is provided so that the EV traveling allowed power value and regeneration acceptable power value WIN become greater.

Furthermore, as to the EV traveling allowed power value, correction coefficient $\alpha(1)$ is applied when EV switch 1200 is on, whereas correction coefficient $\alpha(2)$ is applied when EV switch 1200 is off. The absolute value of correction coefficient $\alpha(1)$ is greater than that of correction coefficient $\alpha(2)$, so that greater EV traveling allowed power value WOUT can be obtained by the calculation, in order to satisfy the request from the driver who wishes to drive the vehicle in EV mode.

Figure 7:
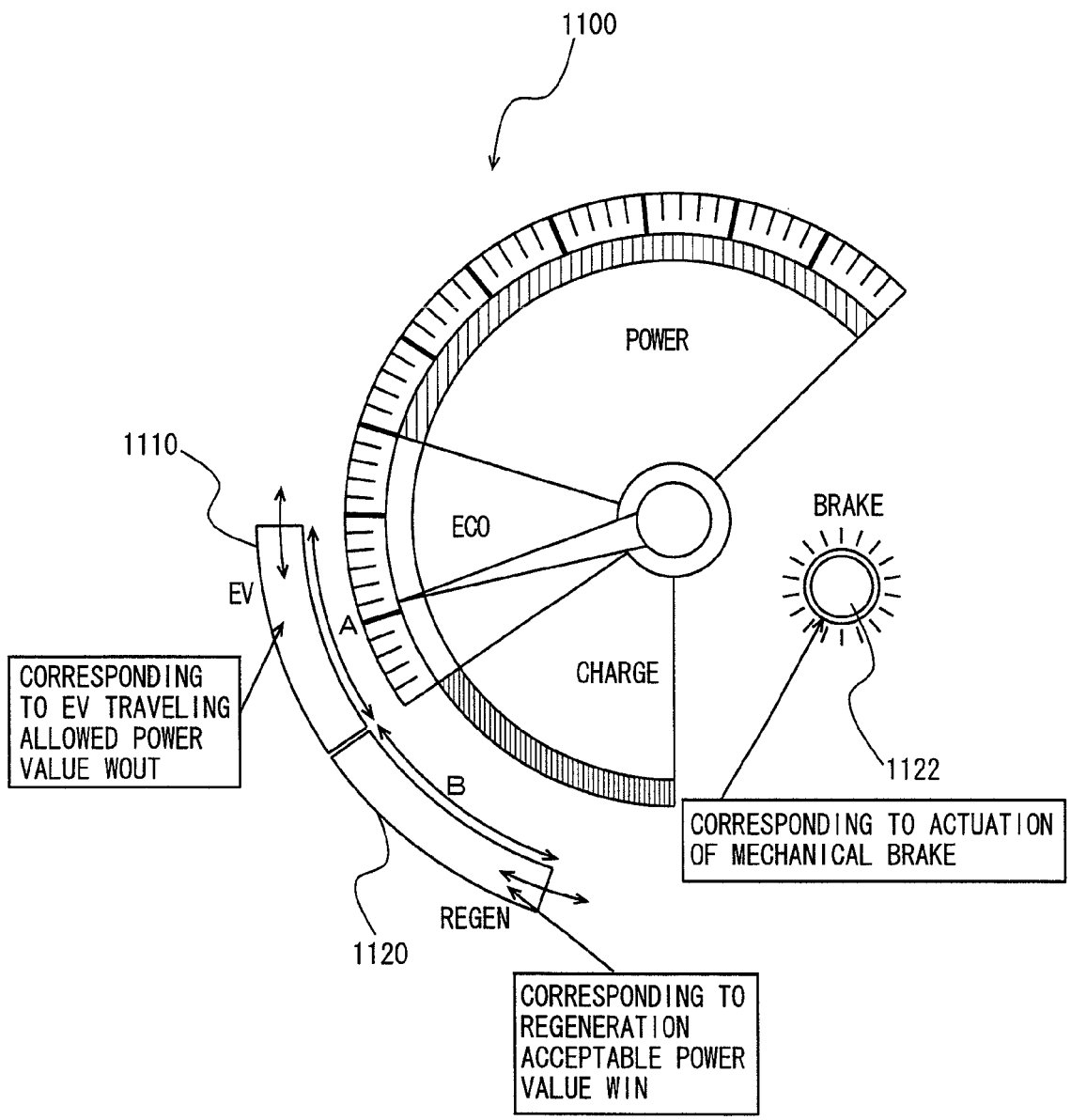
FIG. 7 shows an indication example of a power meter.

Referring to FIG. 7 showing power meter 1100, an operation of HV_ECU 320 controlling the indication apparatus according to the present embodiment based on the above-described configuration and flowcharts will be described. Power meter 1100 shown in FIG. 7 is provided in an instrument panel in front of the driver's seat.

(1) During Motor Traveling with EV Switch on

It is assumed that the driver has pressed EV switch 1200 and allows the vehicle to travel using solely motor-generator 140 as a traveling source without actuating engine 120.

The SOC of traction battery 220 is detected (S100), and temperature TB of traction battery 220 is detected (S110). Since EV switch 1200 is on (YES in S120), temperature correction coefficient α(1) with EV switch on is calculated, using the map shown in FIG. 6 and based on temperature TB of traction battery 220 (S130).

Based on the SOC of traction battery 220 and temperature correction coefficient α(1), EV traveling allowed power value WOUT showing the power with which vehicle is allowed to travel in the EV mode is calculated (S140). EV traveling allowed power value WOUT is transmitted to meter ECU 1000 (S170).

Meter ECU 1000 indicates received EV traveling allowed power value WOUT on EV indication portion 1110 of power meter 1100 shown in FIG. 7. Here, EV traveling allowed power value WOUT is indicated so that the length (shown by A) on the arc of EV indication portion 1110 is longer as EV traveling allowed power value WOUT is greater, and the length on the arc of EV indication portion 1110 is shorter as EV traveling allowed power value WOUT is smaller. Here, the pointer of power meter 1100 shown in FIG. 7 indicates a CHARGE range when traction battery 220 is charged. It indicates an ECO range when traveling in an energy saving mode (including the EV mode). It indicates a POWER range when engine 120 is actuated.

As described above, with EV indication portion 1110 of power meter 1100, the driver can easily recognize the extent of power with which the vehicle is allowed to travel in the EV mode. Therefore, the driver who does not wish to start actuation (startup) of engine 120 in a case where the EV switch has been pressed operates the accelerator pedal so that the pointer will not point higher than EV indication portion 1110 of power meter 1100. As a result, the fuel efficiency can be improved.

(2) During Motor Traveling with EV Switch Off

It is assumed that the driver has not pressed EV switch 1200 and allows the vehicle to travel using solely motor-generator 140 as a traveling source without actuating engine 120.

Similarly to the above-described (1), the SOC of traction battery 220 is detected (S100), and temperature TB of traction battery 220 is detected (S110). Since EV switch 1200 is not on (NO in S120), temperature correction coefficient α(2) with EV switch on is calculated, using the map shown in FIG. 6 and based on temperature TB of traction battery 220 (S150).

Based on the SOC of traction battery 220 and temperature correction coefficient α(2), EV traveling allowed power value WOUT showing the power with which traveling in the EV mode is capable is calculated (S160). EV traveling allowed power value WOUT is transmitted to meter ECU 1000 (S170).

Meter ECU 1000 indicates received EV traveling allowed power value WOUT on EV indication portion 1110 of power meter 1100 shown in FIG. 7. Here, since EV traveling allowed power value WOUT is smaller than in the case of (1), the length on the arc of EV indication portion 1110 is shorter.

As described above, with EV indication portion 1110 of power meter 1100, the driver can easily recognize the extent of power with which the vehicle is allowed to travel in the EV mode. Therefore, the driver who does not wish to start actuation (startup) of engine 120 in a case where the EV switch has not been pressed operates the accelerator pedal so that the pointer will not point higher than EV indication portion 1110 of power meter 1100. As a result, the fuel efficiency can be improved.

(3) REGEN Indication During Deceleration

When the hybrid vehicle travels with or without actuating engine 120 also, the SOC of traction battery 220 is detected (S100), temperature TB of traction battery 220 is detected (S110), and temperature correction coefficient β is calculated, using the map shown in FIG. 6 and based on temperature TB of traction battery 220 (S200).

Based on the SOC of traction battery 220 and temperature correction coefficient β, regeneration acceptable power value WIN showing the power with which traction battery 220 is chargeable (acceptable) is calculated (S210). Regeneration acceptable power value WOUT is transmitted to meter ECU 1000 (S220).

Meter ECU 1000 indicates received regeneration acceptable power value WOUT on REGEN indication portion 1120 of power meter 1100 shown in FIG. 7. Here, regeneration acceptable power value WOUT is indicated so that the length (shown by B) on the arc of REGEN indication portion 1120 is longer as regeneration acceptable power value WOUT is greater, and the length on the arc of REGEN indication portion 1120 is shorter as regeneration acceptable power value WOUT is smaller.

As described above, with REGEN indication portion 1120 of power meter 1100, the driver can easily recognize the extent of power with which regenerative braking is allowed. Therefore, the driver who wishes regeneration of kinetic energy during deceleration so that recovery as electric energy is attained operates the brake pedal so that the pointer will not point higher than REGEN indication portion 1120 of power meter 1100. As a result, the energy can efficiently be recovered.

(4) Indication of the Mechanical Brake Actuation Lamp During Deceleration

When the driver presses down the brake pedal when the hybrid vehicle is traveling (YES in S300), the brake master cylinder pressure is detected (S310). Here, when regeneration acceptable power value WIN of traction battery 220 becomes 0 (or smaller than a threshold value), the energy from regenerative braking cannot be stored on traction battery 120, and therefore the mechanical brake actuates.

When it is determined that the mechanical brake has actuated based on the brake master cylinder pressure (YES in S320), a lamp-on instruction signal for the mechanical brake actuation lamp is transmitted to meter ECU 1000.

Meter ECU 1000 turns on mechanical brake actuation lamp 1122 of power meter 1100 shown in FIG. 7 based on the received lamp-on instruction signal.

As described above, with mechanical brake actuation lamp 1122 of power meter 1100, the driver can easily recognize that the power from regenerative braking has exceeded the power acceptable by traction battery 220 and whereby the mechanical brake has actuated. Therefore, when mechanical brake actuation lamp 1122 of power meter 1100 turns on, the driver who does not wish to convert the kinetic energy to the thermal energy by the mechanical brake during deceleration operates the brake pedal so as to return the brake pedal (in a safe range). As a result, the kinetic energy can be prevented from being wasted.

In the above-described manner, the driver can easily avoid actuation of the engine or the mechanical brake due to the operation of the driver which would consequently deteriorate the fuel efficiency.

First Variation

Figure 8:
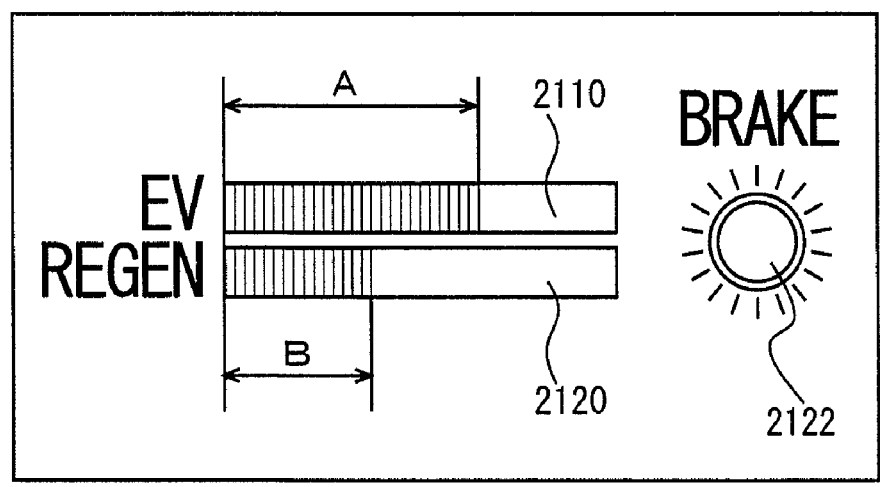
FIG. 8 shows an indication example according to a first variation.

When power meter 1100 is not provided, an indication device as shown in FIG. 8 may be employed. The indication device is provided in the instrument panel in front of the driver's seat.

As shown in FIG. 8, the indication device includes an EV indication portion 2110 corresponding to EV indication portion 1110 in FIG. 7, a REGEN indication portion 2120 corresponding to REGEN indication portion 1120 in FIG. 7, an EV indication portion 2110 corresponding to EV indication portion 1110 in FIG. 7, and a mechanical brake actuation lamp 2122 corresponding to mechanical brake actuation lamp 1122. EV indication portion 2110 and REGEN indication portion 2120 are both in a form of a bar graph.

EV indication portion 2110 indicates a length corresponding to EV traveling allowed power value WOUT (shown by A; A in FIG. 8 corresponds to A shown in FIG. 7). REGEN indication portion 2120 indicates a length corresponding to regeneration acceptable power value WIN (shown by B; B in FIG. 8 corresponds to B shown in FIG. 7). It is to be noted that mechanical brake actuation lamp 2122 is in the same form as mechanical brake actuation lamp 1122.

With such a first variation also, the driver can easily avoid actuation of the engine or the mechanical brake due to the operation of the driver which would consequently deteriorate the fuel efficiency.

It is to be noted that any indication manner other than the power meter in FIG. 7 and the indication device in FIG. 8 may be employed.

Second Variation

In the present variation, mechanical actuation lamp 1122 and mechanical brake actuation lamp 2122 are not turned on in response to actual actuation of the mechanical brake, but are turned on based on a prediction of actuation of the mechanical brake. Accordingly, in the present variation, mechanical brake actuation lamp 1122 or mechanical brake actuation lamp 2122 functions as a mechanical brake actuation prediction lamp.

Figure 9:
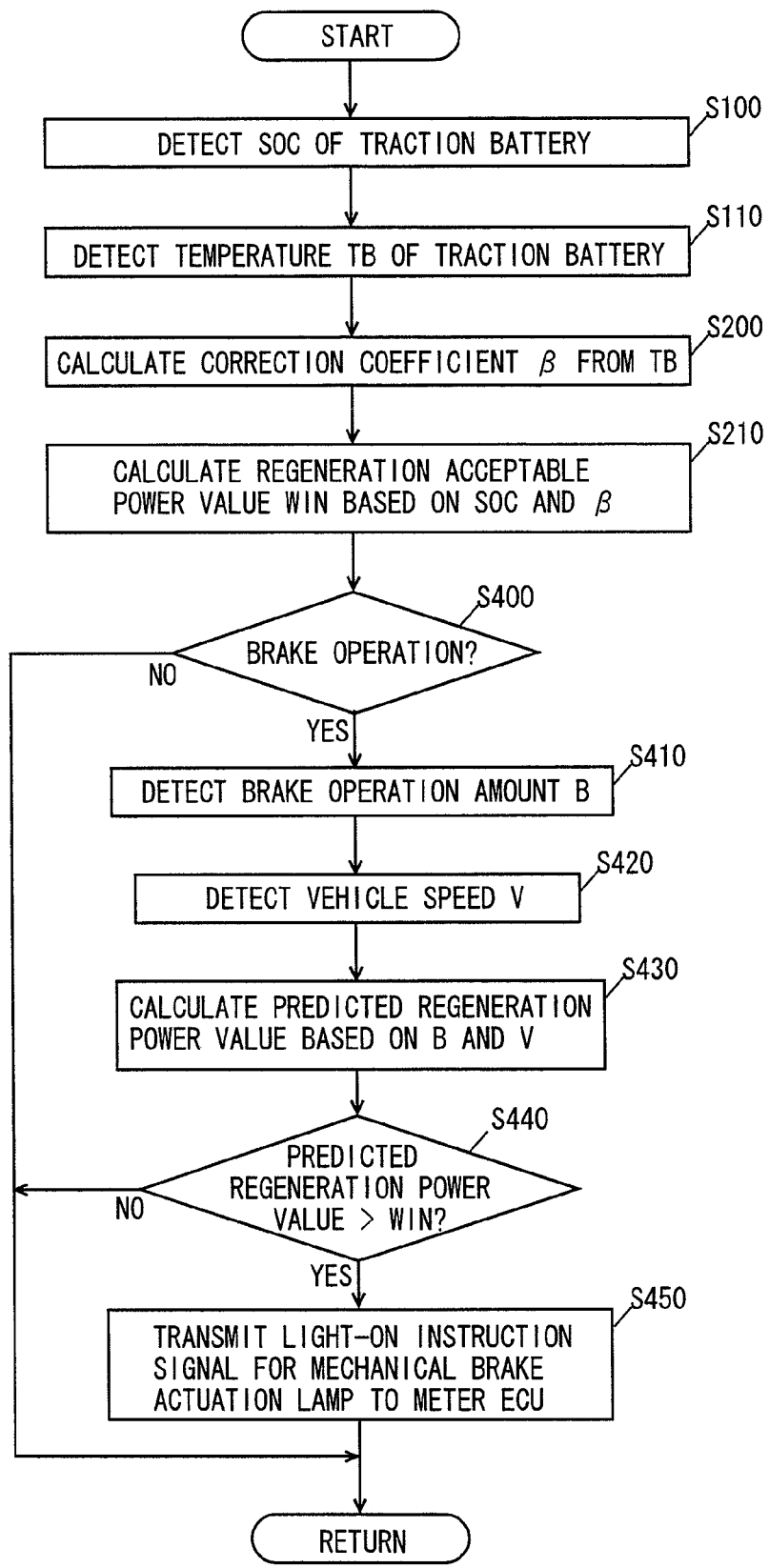
FIG. 9 is a flowchart showing a control structure of a program executed by the hybrid ECU in a second variation.

Referring to FIG. 9, a control structure of a program for turning on the mechanical brake actuation lamp executed by HV_ECU 320 controlling the indication apparatus according to the present variation will be described. It is to be noted that the program (sub-routine) shown by the flowchart is also repeatedly executed by a predetermined cycle time (for example, 80 msec). In the flowchart of FIG. 9, the same step numbers are allotted to the same processes as those shown in FIG. 3 or FIG. 4. Their processing are the same. Accordingly, detailed description thereof will not be repeated herein.

In S400, HV_ECU 320 determines as to whether or not there is a brake operation. Here, HV_ECU 320 determines based on a signal input from a not-shown brake switch. When the driver presses down the foot brake (YES in S400), the processing moves to S410. Otherwise (NO in S400), the processing ends.

In S410, HV_ECU 320 detects a brake operation amount (press-down amount) B. Here, HV_ECU 320 detects brake operation amount B based on a signal input from a not-shown brake operation amount detection sensor.

In S420, HV_ECU 320 detects a vehicle speed V. Here, HV_ECU 320 detects vehicle speed V based on a signal input from a not-shown vehicle speed sensor.

In S430, HV_ECU 320 calculates a predicted regeneration power value based on brake operation amount B (i.e., a deceleration request) and vehicle speed V. Here, HV_ECU 320 calculates, for example, a deceleration rate from the brake operation amount to thereby calculate (including conversion of unit) the power value generated by motor-generator 140 provided that the current vehicle speed is decelerated in accordance with the deceleration rate. It is to be noted that the method of calculating the predicted regeneration power value is not limited to this method.

In S440, HV_ECU 320 determines as to whether or not the predicted regeneration power value is greater than regeneration acceptable power value WIN. Here, it is assumed that the unit of the predicted regeneration power value and that of regeneration acceptable power value WIN are unified. When it is determined that the predicted regeneration power value is greater than regeneration acceptable power value WIN (YES in S440), the processing moves to S450. Otherwise (NO in S440), the processing ends.

In S450, HV_ECU 320 transmits a transfer instruction signal for the mechanical brake actuation lamp to meter ECU 1000.

Indication of the mechanical brake actuation lamp during deceleration by HV_ECU 320 controlling the indication apparatus according to the present variation based on the above-described configuration and flowchart will be described.

When the driver presses down the brake pedal when the hybrid vehicle is traveling (YES in S400), brake operation amount B is detected (S410); vehicle speed V is detected (S420); and the predicted regeneration power value is calculated based on brake operation amount B and vehicle speed V (S430).

When the predicted regeneration power value is greater than regeneration acceptable power value WOUT (YES in S440), it means that the regeneration energy generated by the deceleration from the brake operation can only partially be stored on traction battery 220. That is, it is predicted that the mechanical brake will actuate. Accordingly, a turn-on instruction signal for the mechanical brake actuation lamp is transmitted to meter ECU 1000.

Meter ECU 1000 turns on mechanical brake actuation lamp 1122 of power meter 1100 shown in FIG. 7, based on the received turn-on instruction signal. Here, mechanical brake actuation lamp 1122 may additionally be flashed if the mechanical brake actually starts to actuate. Turning-on and flashing of mechanical brake actuation lamp 1122 may occur in the reverse order. Switching turning-on and flashing of mechanical brake actuation lamp 1122 is advantageous since the driver can more delicately operate the brake pedal.

As described above, with mechanical brake actuation lamp 1122 of power meter 1100, the driver can easily recognize that the power from regenerative braking exceeds the power acceptable by traction battery 220 and the mechanical brake actuates. Therefore, the driver who wishes to regenerate the kinetic energy during deceleration operates the brake pedal so as to return the brake pedal (in a safe range), when mechanical brake actuation lamp 1122 of power meter 1100 turns on. As a result, the kinetic energy can be prevented from being wasted.

In the above-described manner, the driver can easily avoid actuation of the engine or the mechanical brake due to the operation of the driver which would consequently deteriorate the fuel efficiency.

It is to be noted that, mechanical brake actuation lamp 1122 may be turned on not based on the processing in S410-S440 in FIG. 9, but based on regeneration acceptable power value WIN calculated in S210 in FIG. 4 (for example, it may be turned on when regeneration acceptable power value WIN becomes smaller than a threshold value).

Other Variation

In the above-described embodiments, EV traveling allowed power value WOUT and regeneration acceptable power value WIN are corrected using the temperature correction coefficients shown in FIG. 6. On the other hand, EV traveling allowed power value WOUT and regeneration acceptable power value WIN may be calculated directly from temperature TB of traction battery 220 without using the correction coefficients.

Furthermore, EV traveling allowed power value WOUT and regeneration acceptable power value WIN may be corrected in accordance with the actuation state of auxiliary equipment (for example, an air conditioner) mounted on the vehicle.

It should be understood that the embodiments disclosed herein are illustrative and non-restrictive in every respect. The scope of the present invention is defined by the terms of the claims, rather than the description above, and is intended to include any modifications and changes within the meaning and scope equivalent to the terms of the claims.

The invention claimed is:

1. An indication apparatus for a hybrid vehicle employing, as traveling sources for the vehicle, an engine and a rotating electric machine being actuated by electric power supplied from a power storage mechanism, said rotating electric machine being actuated by said engine or driving wheels thereby generating electric power which is in turn stored in said power storage mechanism, comprising:
   an electronic control unit configured to calculate an index with which the vehicle is allowed to decelerate without actuating a mechanical braking mechanism provided to the vehicle; and
   an indicator configured to indicate said index so as to inform a driver of said index.

2. The indication apparatus for the hybrid vehicle according to claim 1, wherein
   said power storage mechanism is a secondary battery, and
   said electronic control unit is configured to calculate said index based on a state of said secondary battery.

3. The indication apparatus for the hybrid vehicle according to claim 2, wherein
   said electronic control unit is configured to calculate said index based on a temperature of said secondary battery.

4. The indication apparatus for the hybrid vehicle according to claim 1, wherein
   said indicator is configured to indicate said index in an instrument panel in front of a driver's seat.

5. An indication apparatus for a hybrid vehicle employing, as traveling sources for the vehicle, an engine and a rotating electric machine being actuated by electric power supplied from a power storage mechanism, said rotating electric machine being actuated by said engine or driving wheels thereby generating electric power which is in turn stored in said power storage mechanism, comprising:
   calculation means for calculating an index with which the vehicle is allowed to decelerate without actuating a mechanical braking mechanism provided to the vehicle; and
   indication means for indicating said index so as to inform a driver of said index.

6. The indication apparatus for the hybrid vehicle according to claim 5, wherein
   said power storage mechanism is a secondary battery, and
   said calculation means includes means for calculating said index based on a state of said secondary battery.

7. The indication apparatus for the hybrid vehicle according to claim 6, wherein
   said calculation means includes means for calculating said index based on a temperature of said secondary battery.

8. The indication apparatus for the hybrid vehicle according to claim 5, wherein
   said indication means includes means for indicating said index in an instrument panel in front of a driver's seat.

9. An indication method for a hybrid vehicle employing, as traveling sources for the vehicle, an engine and a rotating electric machine being actuated by electric power supplied from a power storage mechanism, said rotating electric machine being actuated by said engine or driving wheels thereby generating electric power which is in turn stored in said power storage mechanism, comprising:
   calculating an index with which the vehicle is allowed to decelerate without actuating a mechanical braking mechanism provided to the vehicle by an electronic control unit; and
   indicating said index so as to inform a driver of said index.

10. The indication method for the hybrid vehicle according to claim 9, wherein
    said power storage mechanism is a secondary battery, and
    said index is calculated based on a state of said secondary battery.

11. The indication method for the hybrid vehicle according to claim 10, wherein
    said index is calculated based on a temperature of said secondary battery.

12. The indication method for the hybrid vehicle according to claim 9, wherein
    said index is indicated in an instrument panel in front of a driver's seat.

* * * * *